(12) United States Patent
Sampath et al.

(10) Patent No.: US 7,117,678 B2
(45) Date of Patent: Oct. 10, 2006

(54) FUEL INJECTOR HEAD

(75) Inventors: Parthasarathy Sampath, Mississauga (CA); Qing-Ping Zheng, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 260 days.

(21) Appl. No.: 10/815,822

(22) Filed: Apr. 2, 2004

(65) Prior Publication Data
US 2005/0217270 A1 Oct. 6, 2005

(51) Int. Cl.
F02C 1/00 (2006.01)
F02G 3/00 (2006.01)

(52) U.S. Cl. .......................................... 60/740; 60/748
(58) Field of Classification Search .................. 60/740, 60/748; 239/405
See application file for complete search history.

(56) References Cited

U.S. PATENT DOCUMENTS

| | | | |
|---|---|---|---|
| 2,965,311 A | 12/1960 | Gascoigne | |
| 2,968,925 A * | 1/1961 | Blevans et al. ................ 60/740 |
| 3,029,029 A | 4/1962 | Webster | |
| 3,272,411 A | 9/1966 | Davis, Sr. et al. | |
| 3,638,865 A * | 2/1972 | McEneny et al. ............ 239/424 |
| 3,735,930 A * | 5/1973 | Mori ......................... 239/419.5 |
| 3,741,483 A | 6/1973 | Kawaguchi .................. 239/400 |
| 3,768,250 A | 10/1973 | Kawaguchi ............. 60/39.74 R |
| 3,777,983 A | 12/1973 | Hibbins ....................... 239/422 |
| 3,886,736 A * | 6/1975 | Kawaguchi .................... 60/748 |
| 3,937,011 A * | 2/1976 | Caruel et al. ................. 60/737 |
| 4,221,558 A | 9/1980 | Santisi ......................... 431/183 |
| 4,290,558 A | 9/1981 | Coburn et al. ............... 239/400 |
| 4,609,150 A | 9/1986 | Pane, Jr. et al. .......... 239/397.5 |
| 4,698,014 A | 10/1987 | Grethe et al. .................... 431/9 |
| 5,044,559 A | 9/1991 | Russell et al. ............... 239/406 |
| 5,115,634 A | 5/1992 | Bretz et al. ................. 60/39.02 |
| 5,224,333 A | 7/1993 | Bretz et al. ................. 60/39.06 |
| 5,255,508 A | 10/1993 | Davis ......................... 60/39.32 |
| 5,373,693 A * | 12/1994 | Zarzalis et al. ............. 60/39.23 |
| 5,605,287 A | 2/1997 | Mains ......................... 239/402 |
| 5,737,921 A | 4/1998 | Jones et al. .................... 60/740 |
| 5,761,907 A | 6/1998 | Pelletier et al. ............... 60/740 |
| 6,035,645 A * | 3/2000 | Bensaadi et al. .............. 60/742 |
| 6,082,113 A | 7/2000 | Prociw et al. ................. 60/748 |
| 6,101,814 A * | 8/2000 | Hoke et al. .................... 60/752 |
| 6,289,676 B1 | 9/2001 | Prociw et al. ................. 60/740 |
| 6,289,677 B1 | 9/2001 | Prociw et al. ................. 60/748 |
| 6,460,344 B1 | 10/2002 | Steinthorsson et al. ........ 60/776 |
| 6,547,163 B1 | 4/2003 | Mansour et al. ............. 239/404 |
| 6,560,964 B1 | 5/2003 | Steinhorsson et al. ......... 60/740 |
| 6,823,677 B1 * | 11/2004 | Prociw et al. ................. 60/800 |
| 6,863,228 B1 * | 3/2005 | Mao et al. .................... 239/399 |
| 6,871,488 B1 * | 3/2005 | Oskooei et al. ........... 60/39.465 |
| 6,968,692 B1 * | 11/2005 | Chin et al. ..................... 60/737 |
| 2002/0011064 A1 * | 1/2002 | Crocker et al. ............. 60/39.06 |

FOREIGN PATENT DOCUMENTS

| EP | 0644375 B1 | 6/1994 |
|---|---|---|
| WO | WO02/073089 | 3/2002 |

* cited by examiner

Primary Examiner—William H. Rodríguez
(74) Attorney, Agent, or Firm—Ogilvy Renault LLP (57) ABSTRACT

A gas turbine fuel nozzle head includes an outlet passage having a curved annular transitional surface extending smoothly to a substantially radial and annular surface relative to a central axis of the fuel nozzle head, for providing a low cost and compact structure with improved cold start and altitude re-light capabilities.

20 Claims, 7 Drawing Sheets

FUEL INJECTOR HEAD

FIELD OF THE INVENTION

The present invention relates to gas turbine engines, and more particularly to a fuel nozzle head.

BACKGROUND OF THE INVENTION

Efforts have been made to improve fuel injectors, particularly the fuel nozzle heads, to achieve better atomization of fuel and durability, as conventional gas turbine fuel nozzle heads have shortcomings. For example, carbon build-up or coking on the nozzle body is a problem. One solution to overcome coking is to provide an extremely smooth surface adjacent the nozzle head tip in order to reduce surface friction. However, this is an expensive and often unpractical solution.

Therefore, there is a continuing need for improved gas turbine fuel nozzle heads which control both the fuel spray pattern in an effective and economical manner, facilitating carbon free nozzle tips and efficient cold start operability and low pollutant emissions.

SUMMARY OF THE INVENTION

One object of the present invention is to provide an improved fuel nozzle head.

In accordance with one aspect of the present invention, there is provided a gas turbine fuel nozzle head which comprises a central fuel discharging orifice, and a first annular array of air discharging orifices surrounding the central fuel discharging orifice and communicating with an air source. A common annular outlet passage communicates with the first annular array of air discharging orifices. The common annular outlet passage has a curved annular transitional surface extending smoothly to a substantially radial and annular surface relative to a central axis of the fuel nozzle head, for directing a first portion of a mixing air flow at a fuel flow exiting the fuel discharging orifice.

In accordance with another aspect of the present invention, there is provided a gas turbine fuel nozzle head which comprises a central fuel discharging orifice and a first annular array of air discharging orifices surrounding the central fuel discharging orifice and communicating with an air source. The first annular array of air discharging orifices communicates with a common annular outlet passage having a substantially radial and annular surface relative to a central axis of the fuel nozzle head, for directing a first portion of a mixing air flow substantially perpendicularly towards a fuel flow exiting the fuel discharging orifice. The fuel nozzle head further includes a second annular array of air discharging orifices surrounding the common annular outlet passage and communicating with the air source, for directing a guiding air flow angularly towards a mixed fuel/air flow.

The gas turbine fuel nozzle head preferably comprises an end defining a substantially radial and external surface around the central orifice therein. The central orifice communicates with the common annular outlet passage and the central fuel discharging orifice, for discharging the mixed fuel/air flow.

The present invention provides a low cost and compact structure with accurate air flow control. The present invention has also proved useful in optimizing cold start/altitude re-light capabilities.

Other features and advantages of the present invention will be better understood with reference to the preferred embodiments described hereinafter.

BRIEF DESCRIPTION OF THE DRAWINGS

Reference will now be made to the accompanying drawings, showing by way of illustration preferred embodiments thereof in which.

DETAILED DESCRIPTION OF THE PREFERRED EMBODIMENT

Figure 1:
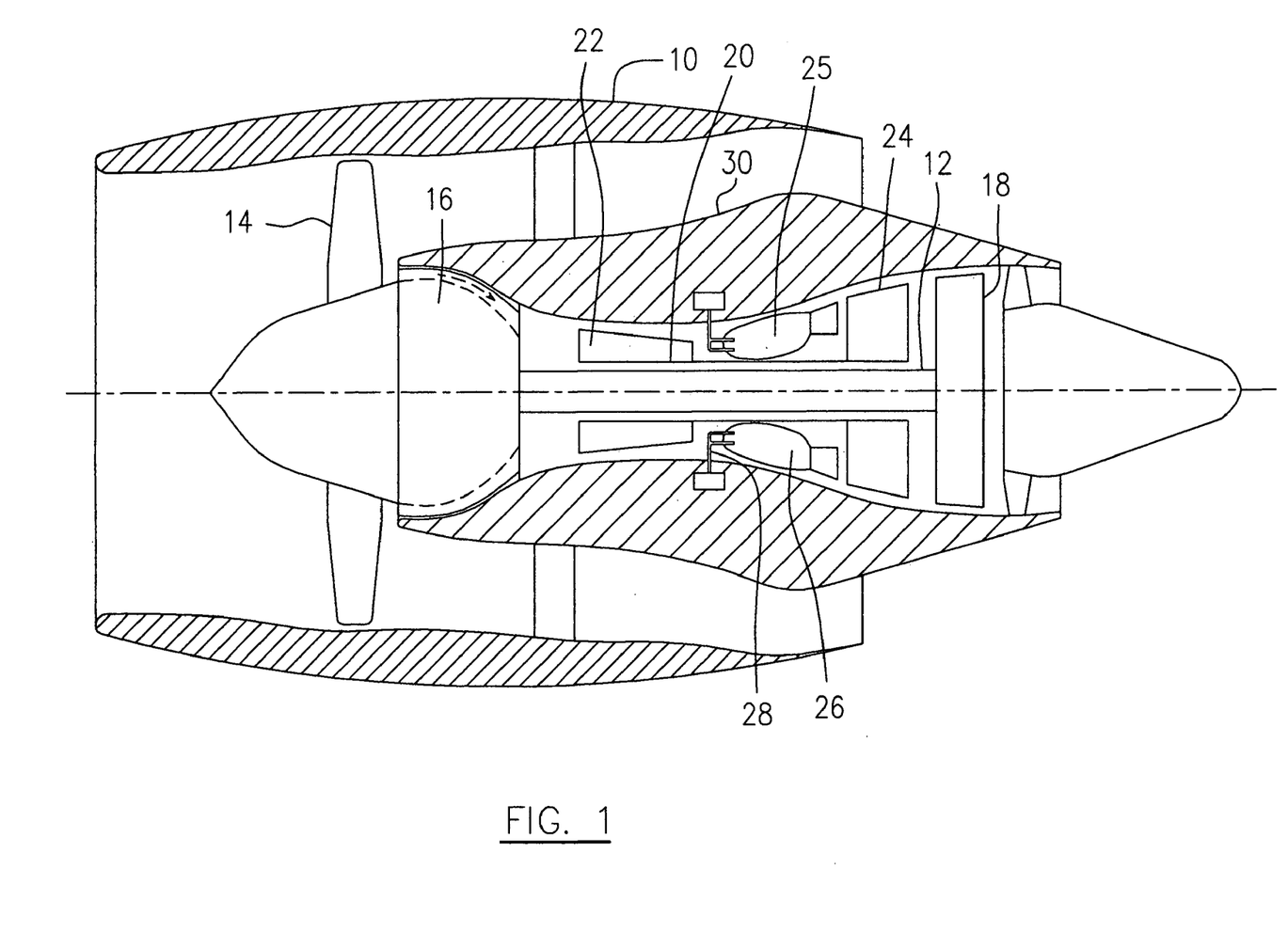
FIG. 1 is a schematic cross-sectional view of an aircraft gas turbine engine.

A typical application is for a turbofan engine illustrated schematically in FIG. 1 incorporates an embodiment of the present invention, presented as an example of application of the present invention, and includes a housing or nacelle 10 a low pressure spool assembly seen generally at 12 which includes a fan 14, low pressure compressor 16 and low pressure turbine 18, a high pressure spool assembly seen generally at 20 which includes a high pressure compressor 22 and a high pressure turbine 24. There is provided a burner seen generally at 25 which includes an annular combustor 26 and a plurality of fuel injectors 28 for mixing liquid fuel with air and injecting the mixed fuel/air flow into the annular combustor 26 for combustion.

Figure 2:
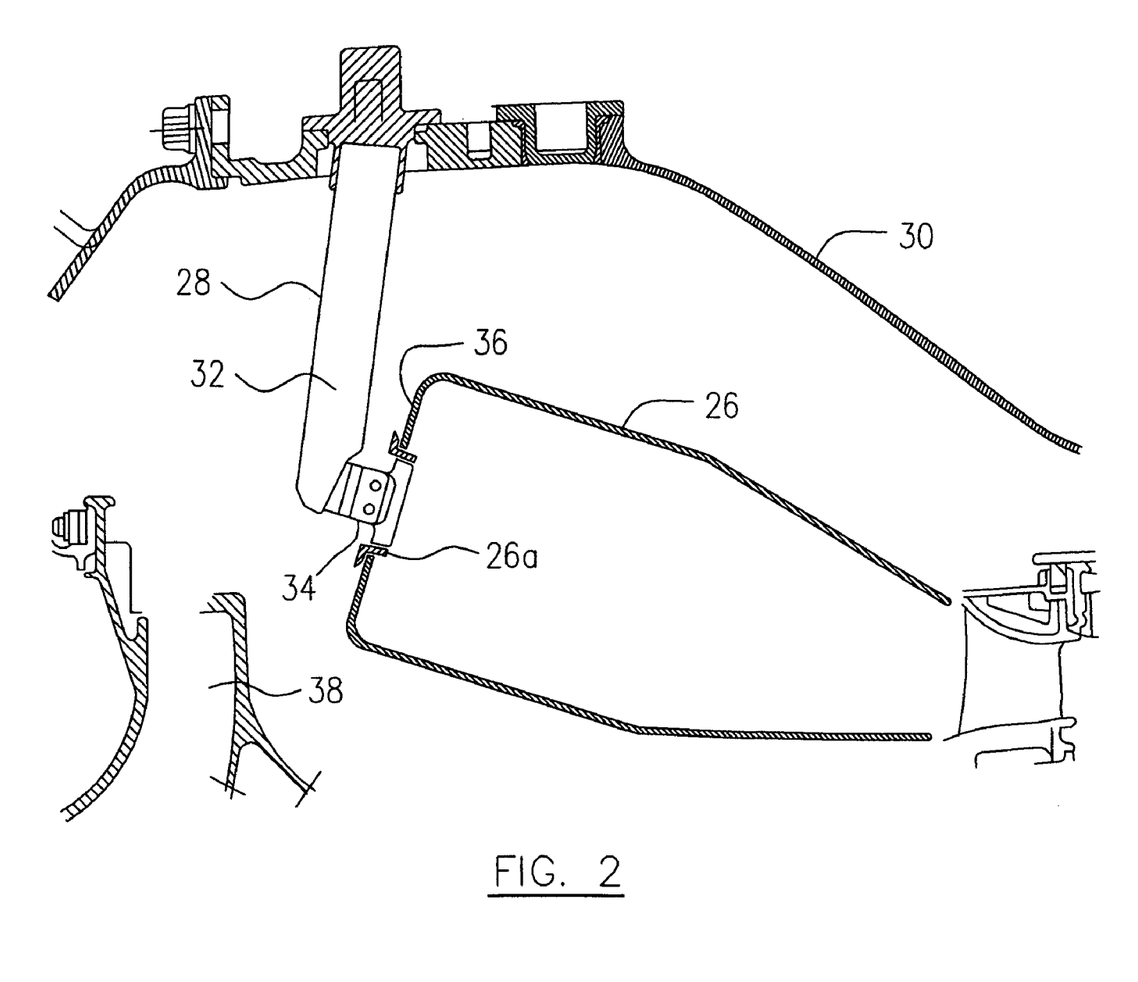
FIG. 2 is a partial enlarged view of FIG. 1, showing the fuel injector and the combustor.

Referring to FIGS. 1 and 2, the annular combustor 26 is disposed between the high pressure compressor 22 and the high pressure turbine 24, and is supported within a core casing 30 of the turbofan engine. The plurality of fuel injectors 28 (only one shown in FIG. 2) are disposed circumferentially spaced apart one from another and mounted within the core casing 30 as illustrated. Each of the fuel injectors 28 includes an elongated stem 32 and a fuel nozzle head 34 connected to the downstream end of the stem 32.

Stem 32 is configured with conventional structures adapted to be affixed to the core casing 30 and to include at least one fuel passage extending therethrough for delivering fuel into the fuel nozzle head 34. The fuel nozzle head 34 is attached to an annular front wall 36 of the annular combustor 26, via a sliding collar 26a for atomizing the fuel and injecting the atomized fuel into the annular combustor 26 for combustion. Compressor air used for the atomizing and injecting of the fuel, as well as for combustion in the combustor 26, is delivered through a compressor air diffuser (not shown) and is filled into the space around the fuel injectors 28 and the annular combustor 26.

Figure 3:
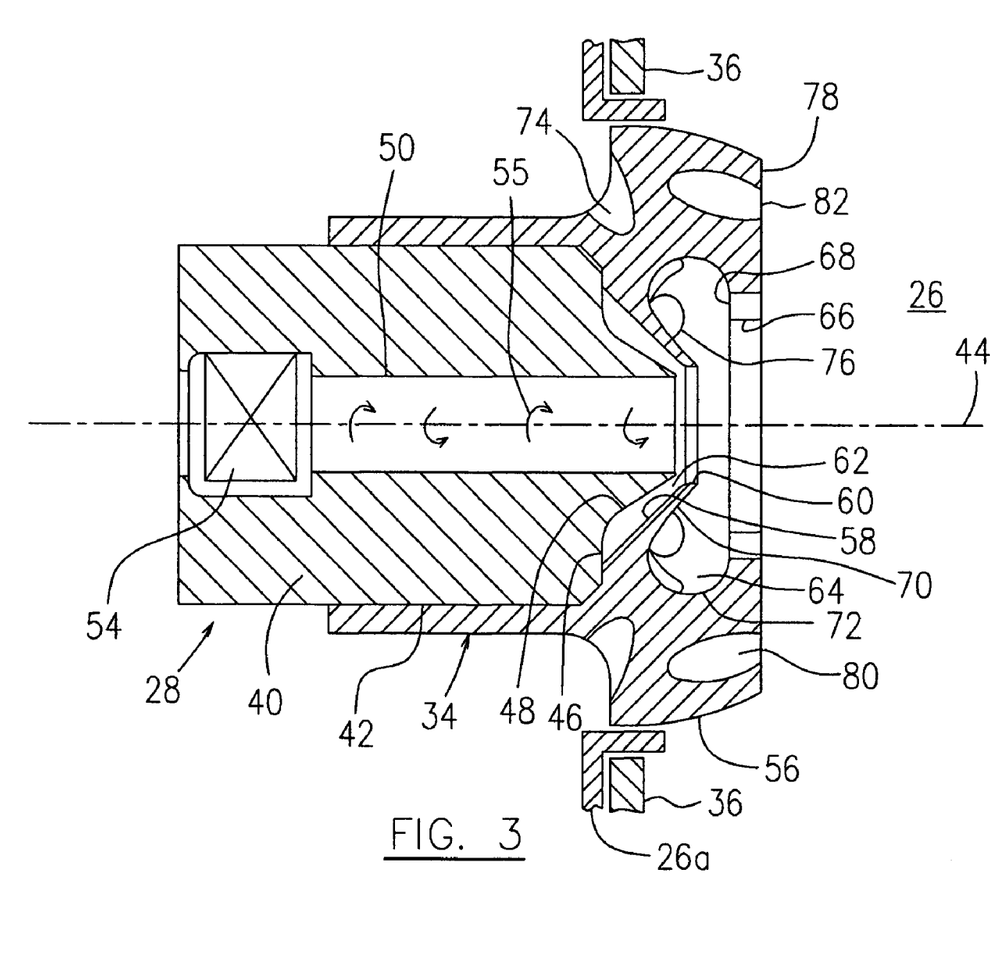
FIG. 3 is a partial cross-sectional view of a fuel injector according to an embodiment of the present invention.

In FIG. 3 the fuel injector 28 is shown as a high-shear airblast fuel injector according to one embodiment of the present invention. The fuel nozzle head 34 includes a nozzle head body 40 attached to the downstream end of the stem 32 of the fuel injector 28 by any well known means such as welding. The nozzle head body 40 includes a cylindrical portion 42 extending axially and outwardly from the downstream end of the stem 32 of the fuel injector 28, and defines a central longitudinal axis 44 thereof. The cylindrical nozzle head body 40 has an end 46 with a truncated conical central portion 48 projecting axially therefrom. A central air passage 50 extends through the cylindrical nozzle head body 40 and terminates at a downstream end of the truncated conical central portion 48. The central air passage 50 communicates with the compressor air in the space within the core casing 30 of FIG. 2. The central air passage 50 further includes an air swirling device which is schematically illustrated at numeral 54, which forces a portion of mixing air to flow in a swirling pattern through the central air passage 50, as indicated by arrows 55. Air inlet passages 52 extend tangentially with respect to the central air passage 50. The swirling direction 55 can be clockwise or anti-clockwise.

The fuel nozzle head 34 further includes a cylindrical head cap 56 which fits onto the nozzle head body 40 and is concentric with the central air passage 50 of the nozzle head body 40. The head cap 56 defines a central truncated conical cavity 58 with a central orifice 60. The truncated conical central portion 48 of the nozzle head body 40 is recessed within the central truncated conical cavity 58 of the head cap 56 in a spaced-apart relationship, thereby forming an annular fuel passage 62 therebetween which communicates with a fuel source (not shown) for discharging the fuel through the central orifice 60 and into the combustor 26.

Figure 4:
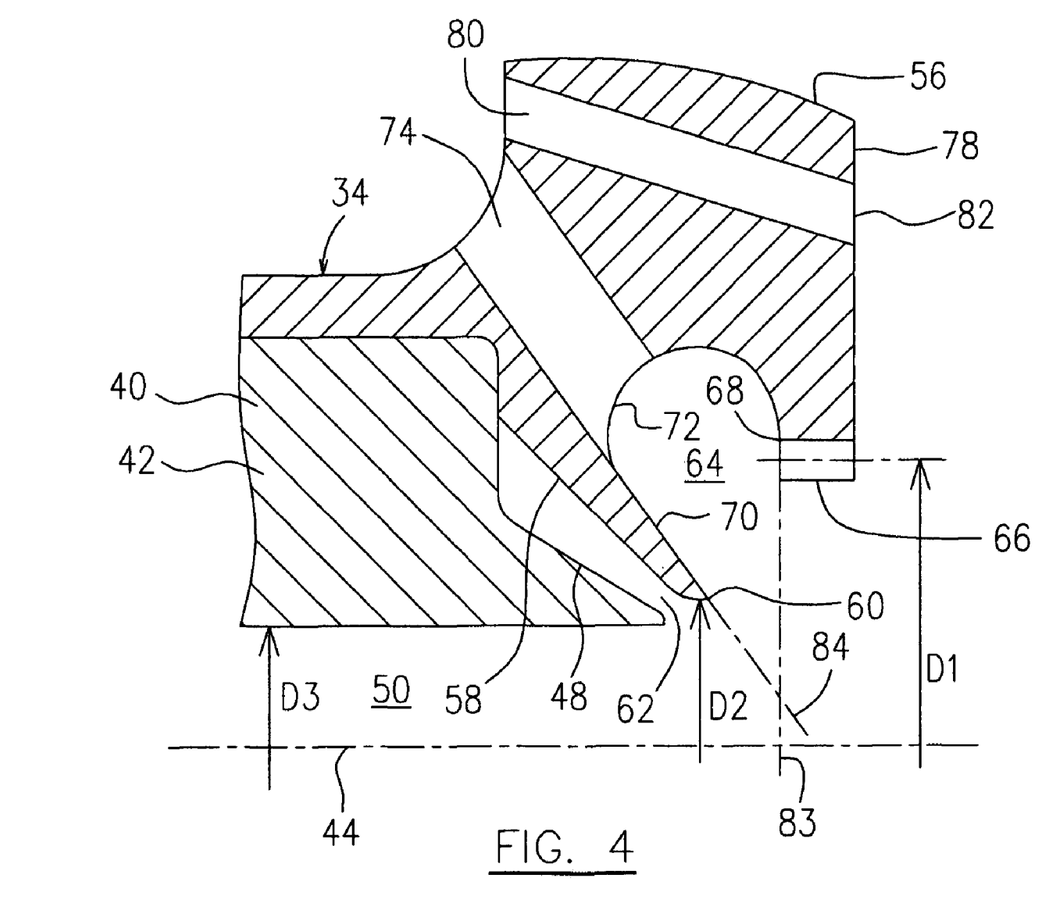
FIG. 4 is a simplified partial view of FIG. 3, showing the tangential mixing air passages and guiding air passages.
Figure 5:
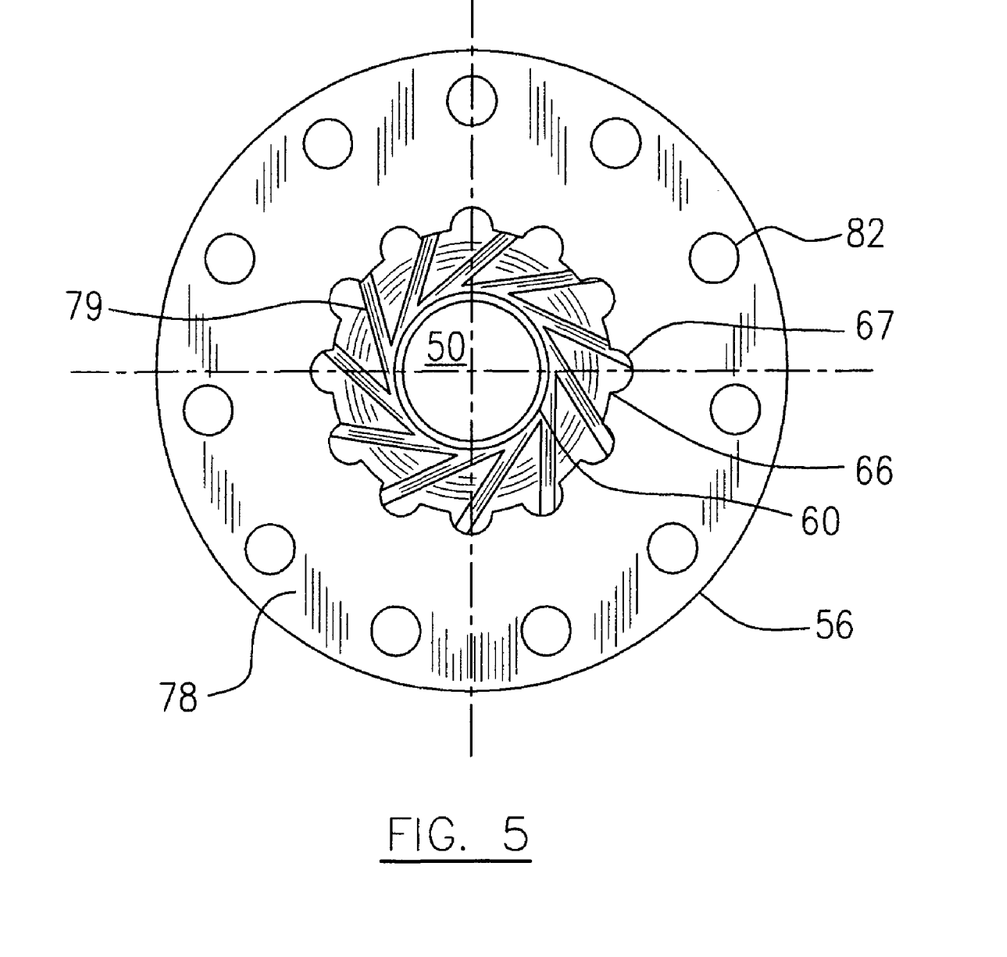
FIG. 5 is a front elevational view of the fuel injector of FIG. 3.

Referring to FIGS. 3–5, the cylindrical head cap 56 further includes an annular cavity 64 communicating with the inside of the combustor 26 through a central nozzle head orifice 66 which is disposed downstream of the central orifice 60, and communicates with the annular fuel passage 62 and the central air passage 50 through the central orifice 60. The central nozzle head orifice 66 may be defined as a circular opening, but is preferably configured with a wiggled periphery. As shown in FIG. 5, the central nozzle head orifice 66 includes a substantially circular periphery with a plurality of cut-outs 67 being preferably disposed circumferentially and evenly around the central nozzle head orifice 66. Each of the cut-outs 67 preferably defines a semi-circular opening. Nevertheless, the cut-outs can be configured with any alternative shapes, such as slots.

The central nozzle head orifice 66 has an average diameter D1 substantially greater than the diameter D2 of the central orifice 60, which is in turn slightly greater than the diameter D3 of the central air passage 50.

The annular cavity 64 is disposed concentrically with respect to the annular fuel passage 62 and the central air passage 50. The annular cavity 64 further defines a substantially radial and annular surface 68 and a truncated conical surface 70. A curved annular transitional surface 72 extends to smoothly join the substantial and annular surface 68 and the truncated conical surface 70. The substantially annular and radial surface 68 forms a smooth extension of the curved annular transitional surface 72 at one end thereof, extending inwardly at a substantially perpendicular angle relative to the longitudinal central axis 44 of the fuel nozzle head 34 and terminating at the central nozzle head orifice 66. At the other end of the curved annular transitional surface 72, the truncated conical surface 70 forms a smooth extension thereof, extending inwardly and angularly towards the longitudinal central axis 44 of the fuel nozzle head 34, and terminating at the central orifice 60.

A plurality of mixing air passages 74 extend inwardly and angularly through the head cap 56 and terminate at the curved annular transitional surface 72, thereby forming a first annular array of air discharging orifices 76 (see FIG. 3). Each of the mixing air passages 74 in the longitudinal cross-section of the fuel nozzle head as shown in FIG. 4, extends at a preferable angle with respect to the longitudinal central axis 44 of the fuel nozzle head 34. Said preferable angle is substantially equal to the conical angle of the truncated conical surface 70. The truncated conical surface 70 defines a plurality of grooves 79 thereon (see FIG. 5), which are disposed to align with the respective mixing air passages 74 to form smooth extensions thereof. The mixing air passages 74 and their extended grooves 79 are preferably disposed tangentially with respect to the central orifice 60 such that the compressor air surrounding the fuel injectors 28 and the combustor 26, is directed through the air passages 74 and into the annular cavity 64 in a swirling pattern.

The cylindrical head cap 56 further includes a front end defining a substantially radial and external surface 78 extending inwardly towards the longitudinal central axis 44 of the fuel nozzle head 34 and terminating at the central nozzle head orifice 66. A plurality of guiding air passages 80 extend tangentially through the cylindrical cap member 56 with respect to the longitudinal central axis 44 of the fuel nozzle head 34, and terminate at the substantially radial and external surface 78 to form a second annular array of air discharging orifices 82. The second annular array of air discharging orifices 82 surround the central nozzle head orifice 66.

In operation, fuel is discharged through the annular fuel passage 62, preferably in a swirling pattern, and meets with the core swirl air flow 55, thereby forming a substantially hollow and cylindrical fuel film exiting the central orifice 60 (which functions as a central fuel discharging orifice) along the longitudinal central axis 44 of the fuel nozzle head 34. The mixing air flow passes through the tangentially disposed mixing air flow passages 74, entering the annular cavity 64 (which functions as a common annular outlet passage). A first portion of the mixing air flow is directed along the curved annular transitional surface 72 and then the substantially radial and annular surface 68, to flow at a substantially perpendicular angle with respect to the longitudinal central axis 44 towards the substantially hollow and cylindrical fuel film. A second portion of the mixing air flow in the annular cavity 64, with its tangential movement inertia, is directed along the truncated conical surface 70 and the tangential grooves 79 thereon, to flow angularly and tangentially towards the substantially hollow and cylindrical fuel film, thereby, in combination with the core swirl air flow within the substantially hollow and cylindrical fuel film, to atomize the fuel film.

The first portion of the mixing air flow possesses less tangential inertia after being directed along the curved transitional annular surface 72 and then the substantially radial annular surface 68, thereby striking the substantially hollow and cylindrical fuel film exiting the central orifice 60 at a very sharp angle, which tends to disrupt low velocity area at a location on the truncated conical surface 70 near the central orifice 60. The first portion of the mixing air flow tends to intersect the second portion of the mixing air flow downstream of the central orifice 60 and within the fuel nozzle head 34, as illustrated by lines 83 and 84 in FIG. 4, thereby maximizing the interaction of the mixing air flow with the substantially hollow and cylindrical fuel film for better atomization of the fuel and greatly reducing the likelihood of coking occurring on the truncated conical surface 70 near the central orifice 60. The curved annular transitional surface 72 reduces pressure losses while providing the sharp angled guidance of the first portion of mixing air flow.

The guiding air flow passes through the guiding air passage 80 and exits the second annular array of orifices 82, to flow tangentially and radially inwards and in a downstream direction towards the mixed fuel/air flow exiting the nozzle head central orifice 66. The angle of the guiding air passages 80 with respect to the longitudinal central axis 44, is smaller than the angle of the mixing air passage 74 with respect to the longitudinal central axis 44 such that the guiding air flow interacts with the mixed fuel/air flow downstream of the fuel nozzle head 34 within the combustor 26 for further atomization of the fuel.

The wiggled periphery of the nozzle head central orifice 66 generates high turbulence flow in the vicinity of the nozzle head central orifice 60. This localized turbulent energy and inherent vortex shedding contribute to improved mixing between nozzle core air and the guiding air flow, thereby improving the interaction of the fuel with the mixing air.

Figure 6:
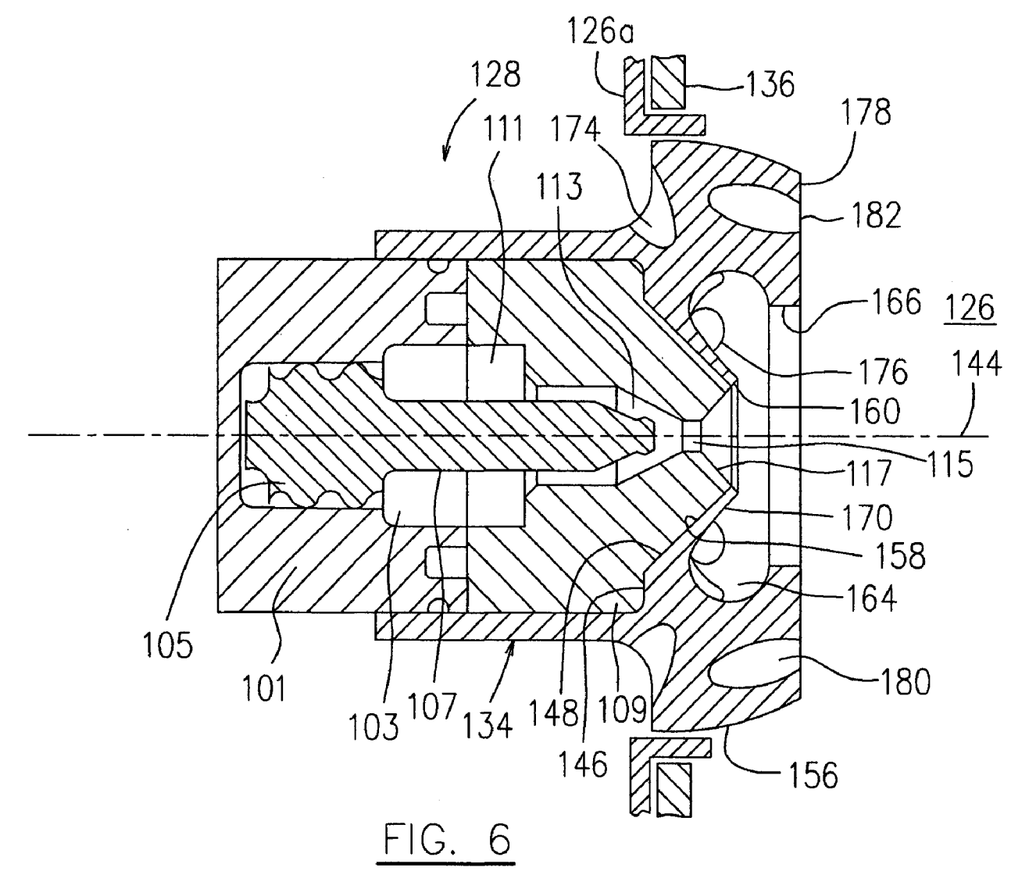
FIG. 6 is a partial cross-sectional view of a fuel injector according to another embodiment of the present invention.

In FIG. 6, another embodiment of the present invention is illustrated which is a high-shear air-assist fuel injector, generally indicated at numeral 128. The high-shear air-assist fuel injector 128 includes components and features similar to those in the high-shear airblast fuel injector 28 of FIG. 3, which are indicated by numerals in the 100 series with the last two digits similar to the numerals indicating similar parts in FIG. 3, and will not therefore be redundantly described.

The fuel nozzle head 134 includes a cylindrical head cap 156 identical to the cylindrical head cap 56 of FIG. 3, except that the central nozzle head orifice 166 includes a circular periphery without the wiggled cut-out portions 67 shown in FIG. 5, as an alternative configuration of the central nozzle head orifice. The fuel nozzle head 134 includes a rear body 101 affixed to the downstream end of the stem 32 of the fuel injector 128, and defines an axial recess 103 which communicates with the fuel passage in the stem 32. A valving device 105 with a stem 107 is provided within the axial recess 103 for adjusting a fuel flow passing through the axial recess 103, preferably in a swirling pattern.

A front body 109 is attached to the rear body 101 and is secured together therewith by the head cap 156 by any well known means such as threads, brazing, etc. The front body 109 includes a rear axial recess 111 having cylindrical sections (not indicated) and a truncated conical section 113 which are disposed co-axially with the central stem 107, and in combination with the axial recess 103 and the central stem 107 form an annular and axial fuel passage defined between the central stem 107 and the rear and front bodies 101, 109. The central annular and axial fuel passage communicates with the annular cavity 164 defined in the head cap 156, through a central hole 115.

The front body 109 includes a front end 146 with a projecting truncated conical central portion 148, similar to those indicated by numeral 46 and 48 of FIG. 3, but the projecting truncated conical central portion 148 is sized to fit into the truncated conical cavity 158 such that no space is provided therebetween. The front body 109 further includes a front central cavity (not indicated) defining an annular surface 117 extending from the central hole 115 radially and outwardly in a downstream direction relative to the fuel flow, and terminating at the central orifice 160 defined in the head cap 156.

In operation the fuel is delivered through the fuel passage (not shown) in the stem 32 into the annular and axial fuel passage around the central stem 107, preferably in a swirling pattern, and is discharged through the central hole 115 and the central orifice 160 to mix with the first and second portions of mixing air flow within the head cap 156. The mixed fuel/air flow then further interacts with the guiding air flow discharged from the orifices 182 at a location downstream of the fuel nozzle head 134. The fuel atomization of this embodiment is similar to that described with respect to the high-shear airblast fuel injector 28 of FIG. 3, with the exception of having no core swirl air flow contained within the fuel/air flow.

The present invention further advantageously provides a simple structure which uses holes and slots surrounding the fuel exit, thereby accurately controlling the mixing and guiding air flows with relatively low manufacturing expenses, in contrast to the conventional vane swirler configuration. Furthermore, the present invention provides high-shear interaction of mixing air with the fuel flow to achieve desirable atomization of fuel and avoid restriction of the air affective area usually associated with a compact hole and slot configuration. The high-shear airblast or air-assist fuel injectors of the present invention particularly improve cold start and altitude re-light operations.

Figure 7:
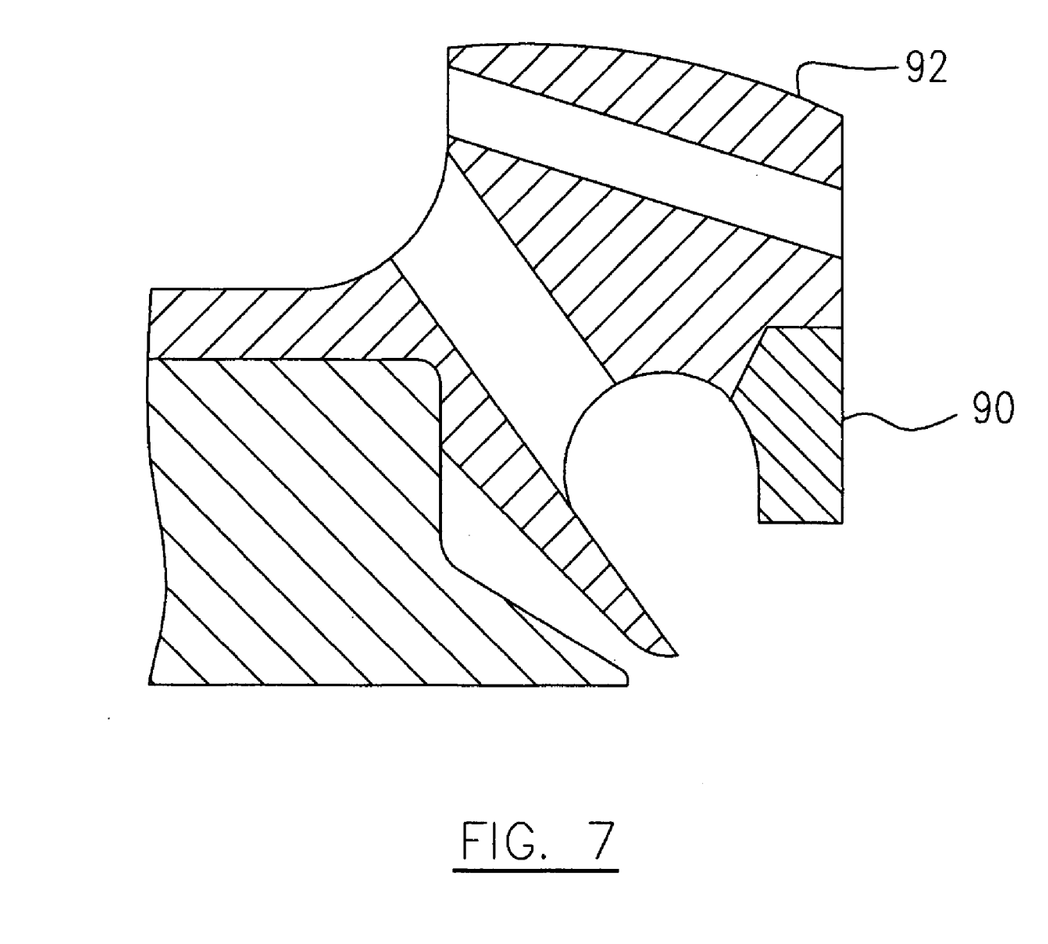
FIG. 7 is a partial cross-sectional view of a fuel injector according to another embodiment of the present invention.

Modifications and improvements to the above-described embodiments of the present invention will be apparent to those skilled in the art. For example, the present invention may be applied to other nozzle types than simply the examples presented. Similarly, the invention may be employed in other environments than those described, and is not limited to the gas turbine or combustor configurations presented. Though presented as a single-piece design, a fuel nozzle head according to the present invention may be provided in any number of pieces, and any configuration which may, for example, facilitate manufacturing, etc. For instance, the invention may be provided as a "cap" or insert 90 co-operating with a fuel nozzle body 92, as shown in FIG. 7. Thus, the foregoing description is intended to be exemplary rather than limiting and the scope of the present invention is therefore intended to be limited solely by the scope of the appended claims.

We claim:

1. A gas turbine fuel nozzle head, comprising:
a central fuel discharging orifice;
a first annular array of air discharging orifices surrounding the central fuel discharging orifice and communicating with an air source; and
a common annular outlet passage communicating with the first annular array of air discharging orifices, the common annular outlet passage having a curved annular transitional surface extending smoothly to a radial and annular surface substantially perpendicular relative to a central axis of the fuel nozzle head for directing a first portion of a mixing air flow at a fuel flow exiting the fuel discharging orifice.

2. A gas turbine fuel nozzle head as claimed in claim 1 wherein the common annular outlet passage comprises a truncated conical surface smoothly connected to the curved annular transitional surface and extending inwardly for directing a second portion of the mixing air flow toward the fuel flow exiting the fuel discharging orifice.

3. A gas turbine fuel nozzle head as claimed in claim 2 wherein the truncated conical surface defines a plurality of grooves thereon extending inwardly and tangentially with respect to the central fuel discharging orifice.

4. A gas turbine fuel nozzle head as claimed in claim 3 comprising a plurality of mixing air passages extending therethrough and terminating at the curved annular transitional surface, thereby forming the first annular array of air discharging orifices, the mixing air passages being disposed to align with the respective grooves such that the grooves form extensions of the respective mixing air passages.

5. A gas turbine fuel nozzle head as claimed in claim 3 wherein the substantially radial and annular surface of the common annular outlet passage extends inwardly and terminates at a central nozzle head orifice which is disposed downstream of the central fuel discharging orifice and which has a diameter greater than a diameter of the central fuel discharging orifice.

6. A gas turbine fuel nozzle head as claimed in claim 5 comprising a second annular array of air discharging orifices communicating with the air source for directing a guiding air flow, the second annular array of air discharging orifices surrounding the central nozzle head orifice, and being defined on a substantially radial and external surface of the fuel nozzle head which extends inwardly and terminates at the central nozzle head orifice.

7. A gas turbine fuel nozzle head as claimed in claim 6 comprising a plurality of guiding air passages extending tangentially therethrough with respect to the central axis of the fuel nozzle head and terminating at the substantially radial and external surface of the fuel nozzle head to form the second annular array of air discharging orifices.

8. A gas turbine fuel nozzle head as claimed in claim 5 comprising a central air passage communicating with the air source and the central fuel discharging orifice, an annular fuel discharging passage being disposed around and communicating with the central air passage to direct the fuel flow exiting the central fuel discharging orifice with a central mixing air flow therein.

9. A gas turbine fuel nozzle head as claimed in claim 1 wherein the nozzle head comprises a plurality of pieces, and wherein said plurality includes a body and a cap co-operating to at least partially define the common outlet passage.

10. A gas turbine fuel nozzle head as claimed in claim 6 wherein the central nozzle head orifice comprises a periphery with a plurality of cut-outs to generate turbulence of a mixed fuel/air flow exiting the central nozzle head orifice.

11. A gas turbine fuel nozzle head as claimed in claim 10 wherein the cut-outs comprise a plurality of semi-circular openings circumferentially and evenly disposed around the orifice.

12. A gas turbine fuel nozzle head, comprising:
a central fuel discharging orifice;
a first annular array of air discharging orifices surrounding the central fuel discharging orifice and communicating with an air source;
a common annular outlet passage communicating with the first annular array of air discharging orifices, the common annular outlet passage having a substantially radial and annular surface relative to a central axis of the fuel nozzle head for directing a first portion of a mixing air flow substantially perpendicularly towards a fuel flow exiting the fuel discharging orifice; and
a second annular array of air discharging orifices surrounding the common annular outlet passage and communicating with the air source for directing a guiding air flow angularly towards a mixed fuel/air flow.

13. A gas turbine fuel nozzle head as claimed in claim 11 comprising an end defining a substantially radial and external surface round a central orifice therein, the central orifice communicating with the common annular outlet passage and the central fuel discharging orifice for discharging the mixed fuel/air flow.

14. A gas turbine fuel nozzle head as claimed in claim 13 wherein the substantially radial and annular surface of the common annular outlet passage extends inwardly and terminates at the central orifice of the fuel nozzle head, the central orifice having a diameter greater than a diameter of the central fuel discharging orifice.

15. A gas turbine fuel nozzle head as claimed in claim 12 wherein the common annular outlet passage comprises a truncated conical surface for directing a second portion of the mixing air flow angularly towards the fuel flow exiting the central fuel discharging orifice, the truncated conical surface being disposed upstream of the substantially radial and annular surface of the common annular outlet passage with respect to the fuel flow.

16. A gas turbine fuel nozzle head as claimed in claim 15 comprising a plurality of mixing air passages extending tangentially with respect to the central fuel discharging orifice, to the common annular outlet passage, extensions of the mixing air passage in the common annular outlet passage forming a plurality of grooves defined in the truncated surface, respectively.

17. A gas turbine fuel nozzle head as claimed in claim 16 wherein the common annular outlet passage comprises a curved annular transitional surface smoothly connecting the substantially radial and annular surface and the truncated conical surface.

18. A gas turbine fuel nozzle head as claimed in claim 15 comprising an annular surface extending from a central hole, radially, outwardly and in a downstream direction relative to the fuel flow, terminating at the central fuel discharging orifice, the central hole communicating with a fuel passage.

19. A gas turbine fuel nozzle head as claimed in claim 15 comprising a central air passage communicating with the air source and the central fuel discharging orifice, an annular fuel discharging passage being disposed around and communicating with the central air passage such that the fuel flow exits the central fuel discharging orifice with a central mixing air flow therein.

20. A gas turbine fuel nozzle head as claimed in claim 12 wherein the nozzle head comprises a plurality of pieces, and wherein said plurality includes a body and a cap co-operating to at least partially define the common outlet passage.

* * * * *